(12) United States Patent
Robinson

(10) Patent No.: US 7,616,842 B2
(45) Date of Patent: *Nov. 10, 2009

(54) END-TO-END DESIGN OF ELECTRO-OPTIC IMAGING SYSTEMS WITH CONSTRAINED DIGITAL FILTERS

(75) Inventor: M. Dirk Robinson, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 659 days.

This patent is subject to a terminal disclaimer.

(21) Appl. No.: 11/332,640

(22) Filed: Jan. 13, 2006

(65) Prior Publication Data

US 2007/0002158 A1 Jan. 4, 2007

Related U.S. Application Data

(63) Continuation-in-part of application No. 11/155,870, filed on Jun. 17, 2005.

(51) Int. Cl.
*G06K 7/00* (2006.01)
*G06K 9/40* (2006.01)
*H04N 5/225* (2006.01)

(52) U.S. Cl. .................. 382/312; 382/254; 348/335

(58) Field of Classification Search .............. 382/254, 382/260, 265, 274, 275, 295, 305, 312, 317, 382/321; 348/335, 207.99; 375/240.29
See application file for complete search history.

(56) References Cited

U.S. PATENT DOCUMENTS 5,227,890 A    7/1993  Dowski
5,521,695 A    5/1996  Dowski
5,715,483 A *  2/1998  Omata et al. ............... 396/80
5,748,371 A    5/1998  Cathey
5,870,179 A    2/1999  Cathey
6,021,005 A    2/2000  Cathey
6,069,738 A    5/2000  Cathey
6,437,925 B1 * 8/2002  Nishioka .................. 359/726

(Continued)

FOREIGN PATENT DOCUMENTS

EP          0814605 A2     12/1997

(Continued)

OTHER PUBLICATIONS

Maeda, Peter Y., Peter B. Catrysse, and Brain A. Wandell, "Integrating lens design with digital camera simulation," 5678 *SPIE Proceedings SPIE Electronic Imaging*, San Jose, CA, Feb. 2005, pp. 48-58.

(Continued)

*Primary Examiner*—Kanji Patel
(74) *Attorney, Agent, or Firm*—Fenwick & West LLP

(57) ABSTRACT

A unified design strategy takes into account different subsystems within an overall electro-optic imaging system. In one implementation, the design methodology predicts end-to-end imaging performance using a spatial model for the source and models for the optical subsystem, the detector subsystem and the digital image processing subsystem. The optical subsystem and digital image processing subsystems are jointly designed taking into account the entire system. The intermediate image produced by the optical subsystem is not required to be high quality since, for example, the quality may be corrected by the digital image processing subsystem.

23 Claims, 10 Drawing Sheets

U.S. PATENT DOCUMENTS

| | | | |
|---|---|---|---|
| 6,525,302 | B2 | 2/2003 | Dowski |
| 6,809,995 | B2 * | 10/2004 | Kadlec et al. ............ 369/44.29 |
| 6,842,297 | B2 | 1/2005 | Dowski |
| 6,873,733 | B2 | 3/2005 | Dowski |
| 6,891,781 | B2 * | 5/2005 | Kadlec et al. ............ 369/44.27 |
| 6,911,638 | B2 | 6/2005 | Dowski |
| 6,940,649 | B2 | 9/2005 | Dowski |
| 7,379,613 | B2 * | 5/2008 | Dowski et al. .............. 382/255 |
| 2002/0118457 | A1 | 8/2002 | Dowski |
| 2002/0195548 | A1 | 12/2002 | Dowski |
| 2003/0057353 | A1 | 3/2003 | Dowski |
| 2003/0169944 | A1 | 9/2003 | Dowski |
| 2003/0173502 | A1 | 9/2003 | Dowski |
| 2004/0145808 | A1 | 7/2004 | Cathey |
| 2004/0190762 | A1 | 9/2004 | Dowski |
| 2004/0228005 | A1 | 11/2004 | Dowski |
| 2004/0257543 | A1 | 12/2004 | Dowski |
| 2005/0088745 | A1 | 4/2005 | Cathey |
| 2005/0117114 | A1 | 6/2005 | Jiang |
| 2005/0197809 | A1 | 9/2005 | Dowski |
| 2005/0264886 | A1 | 12/2005 | Dowski |

FOREIGN PATENT DOCUMENTS

| | | |
|---|---|---|
| EP | 0998124 A2 | 5/2000 |
| WO | WO 2004/063989 A2 | 7/2004 |

OTHER PUBLICATIONS

Cathey, W. Thomas and Edward R. Dowski, "New paradigm for imaging systems," *Applied Optics*, vol. 41, No. 29, Oct. 10, 2002, pp. 6080-6092.

Fales, C.L. et al., "Imaging System Design for Improved Information Capacity," Applied Optics, Mar. 15, 1984, pp. 872-888, vol. 23, No. 6.

European Search Report, EP06253130, Sep. 26, 2005, 7 pages.

* cited by examiner

Optimized Filter Footprint

END-TO-END DESIGN OF ELECTRO-OPTIC IMAGING SYSTEMS WITH CONSTRAINED DIGITAL FILTERS

CROSS-REFERENCE TO RELATED APPLICATION

This application is a continuation-in-part of U.S. patent application Ser. No. 11/155,870, "End to End Design of Electro-optic Imaging Systems," filed Jun. 17, 2005 by M. Dirk Robinson and David G. Stork. The subject matter of the foregoing is incorporated herein by reference in its entirety.

BACKGROUND OF THE INVENTION

1. Field of the Invention

This invention relates generally to the design of electro-optic imaging systems, and more particularly, to the "end-to-end" design of systems which have constraints on the digital filters used in the digital image processing subsystem.

2. Description of the Related Art

Electro-optic imaging systems typically include an optical subsystem (e.g., a lens assembly), an electronic detector subsystem (e.g., CCD detector array) and a digital image processing subsystem (e.g., typically implemented in dedicated chips or software). Traditional methods for designing these systems generally involve two discrete stages. First, the optical subsystem is designed with the goal of forming a high quality intermediate optical image of the source (subject to cost, physical and other non-imaging constraints). Next, after the optical subsystem has been designed, the digital image processing subsystem is designed to compensate for remaining defects in the sampled intermediate optical image.

The two design stages typically occur with very little coordination between the optical designer and the image processing designer. The separation of these stages is a reflection of the significant differences between the fields of optics and image processing in their methods, tools, goals and constraints. For example, each field covers a large swath of potential applications but there typically is little overlap between the two fields other than the design of electro-optic imaging systems. The design of conventional microscopes, telescopes, eyeglasses, etc. typically does not consider any significant image processing. Likewise, areas of image processing such as compression, computer graphics, and image enhancement typically do not involve any significant optics. As a result, each field has evolved independent of the other and with its own unique terminology, best practices, and set of tools. In general, the familiarity required to master each of these domains hinders a unified perspective to designing electro-optic imaging systems. One important challenge to a unified perspective is the lack of a common language with which to describe the problems and approaches between the two distinct fields. One prominent example can be seen in the thinking about the fundamental conceptual elements associated with each field. Optical designers deal with rays of light and passive optical elements whereas image processors deal with bytes of information and active algorithms. The laws and constraints governing these two fundamental classes of entities differ in numerous ways.

One drawback to the traditional design approach is that synergies between the optical subsystem and the digital image processing subsystem may be overlooked. The optical designer creates the "best" optical subsystem without knowledge of the digital image processing subsystem. The image processor creates the "best" digital image processing subsystem without the ability to modify the previously designed optical subsystem. Both of these design tasks may proceed without taking advantage of knowledge about the characteristics of the source being imaged. These subsystems are then "glued" together to form the electro-optic imaging system. The concatenation of two independently designed "best" subsystems may not yield the "best" overall system. There may be unwanted interactions between the two independently designed subsystems and potential synergies between the two subsystems and/or with the source characteristics may go unrealized.

Thus, there is a need for design approaches based on an end-to-end design of the electro-optic imaging system, especially where the entire electro-optical system is considered as a whole, and designed for optimized performance.

SUMMARY OF THE INVENTION

The present invention overcomes the limitations of the prior art by providing a unified design strategy that takes into account different subsystems within the overall electro-optic imaging system. In one implementation, the design methodology predicts end-to-end imaging performance using models for the source, the optical subsystem, the detector subsystem and the digital image processing subsystem. The optical subsystem is then designed taking into account these other subsystems. For example, the optical subsystem and the digital image processing subsystem may be designed jointly based on a post-processing performance metric that takes into account the effects of the image processing. Unlike in conventional approaches, the intermediate optical image produced by the optical subsystem is not required to be high image quality since, for example, the image may be subsequently improved by the digital image processing subsystem.

The design methodology views the combined electro-optic imaging system as a whole and attempts to optimize a set of design parameters for a desired output. In this way, this framework offers a unified perspective and language with which to evaluate the end-to-end performance of an electro-optic imaging system. In effect, such a method relaxes the traditional requirement that the intermediate optical image formed by the optical subsystem be high image quality, as measured by traditional optical figures of merit such as wavefront error or spot size.

In one implementation, the design approach includes modeling propagation through the electro-optic imaging system based on a spatial model of the source. The optical subsystem and digital filter(s) used in the digital image processing subsystem are then jointly designed based directly on a post-processing performance metric, subject to certain size constraints on the digital filter. The post-processing performance metric is calculated based on the modeled propagation. This is done without requiring that the optical subsystem form a high quality intermediate optical image of the source.

In one class of applications, the optical subsystem and detector subsystem are modeled as a linear system characterized by a "total transfer function" and the digital image processing subsystem uses digital filter(s). The total transfer function (or components of it, such as the optical point spread function) may be space varying. In one approach, the image space is divided into tiles and the total transfer function is modeled as space invariant within the tile but may vary from tile to tile. The digital filter may also be space varying. For example, the image space may be divided into filter domains (which may or may not be the same as the tiles), and different filter kernels applied to each filter domain. Different color channels may also be filtered by different wavelength-dependent filters, or by a common wavelength-independent filter.

In one aspect of the invention, the digital filter includes one or more filter kernels. The filter kernels are constrained to a fixed footprint but the filter weights (i.e., filter coefficients) are adjusted as part of the joint design process. In an alternate embodiment, both the coefficients and the footprint are adjusted as part of the joint design process. For example, the filter may be constrained to a total number of coefficients, but the shape of the footprint may be allowed to vary. The shape and/or size of the filter domains may also be adjusted as part of the joint design process.

In some cases, better systems can be designed by separating spatial shift (i.e., geometric distortion) and blur. For example, in the case where a point spread function has a spatial shift, rather than designing a digital filter to compensate both for the spatial shift and the blur introduced by the point spread function, the digital filter can compensate primarily for the blur with the spatial shift removed otherwise. During the design process, the spatial shift can be removed from the point spread function and the digital filter then designed based on the point spread function (or resulting total transfer function) after removal of the spatial shift.

The post-processing performance metric will vary by application. However, a preferred digital image performance metric is the mean square error between an ideal image of the source and the image produced by propagation of the source through the electro-optic imaging system. This metric is especially appropriate for systems that can be modeled as linear systems.

One advantage of the joint design approach is that the resulting electro-optic imaging system may achieve the same system performance as a traditionally designed system, but possibly with fewer components, smaller size, lower cost, faster development time or less sensitivity (e.g., to manufacturing or environmental variations). This is because the intermediate optical image is no longer required to be of high image quality, thus opening up new areas in the design space. In these designs, the overall system performance may be the same or better than that of a traditionally designed system, even though the optical subsystem may form an intermediate optical image that is significantly worse in image quality than that formed by the traditionally designed optical subsystem. In these designs, the optical subsystem may introduce significant aberrations in the intermediate optical image so long as these are adequately corrected by the digital image processing subsystem.

Other aspects of the invention include software and tools to implement the design methods described above, and devices, systems and subsystems created by this design approach.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
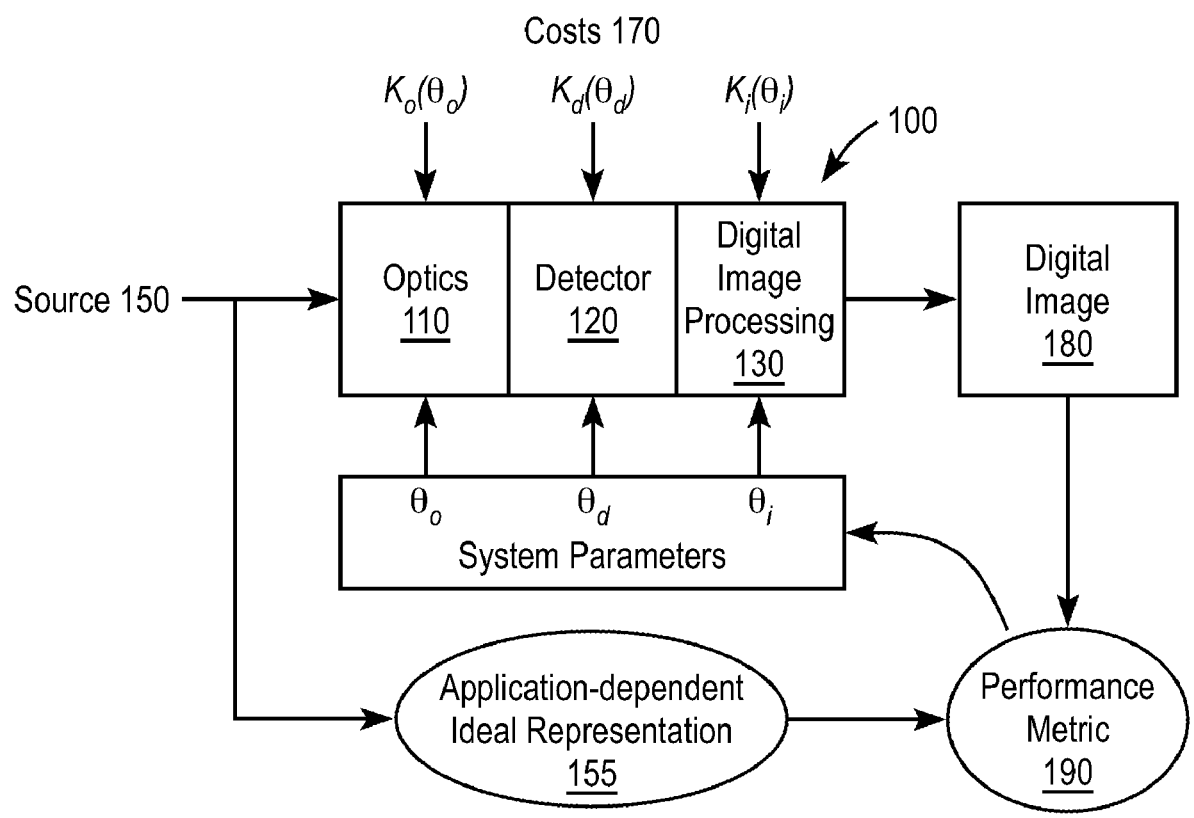
FIG. 1 is a block diagram illustrating the problem of designing an electro-optic imaging system.

FIG. 1 is a block diagram illustrating the problem of designing an electro-optic imaging system 100. The imaging system 100 includes an optical subsystem 110, detector subsystem 120 and digital image processing subsystem 130. In this particular example, the digital image processing subsystem 130 includes digital filter(s) to filter the image captured by the detector subsystem 120. The imaging system 100 is intended to image a source 150 and produces digital image 180. The general design problem is to design the imaging system 100 to "optimize" its overall performance, subject to certain constraints. In many cases, the goal of optimization is to produce a digital image 180 which matches the application-specific idealized version 155 of the input source.

Figure 2:
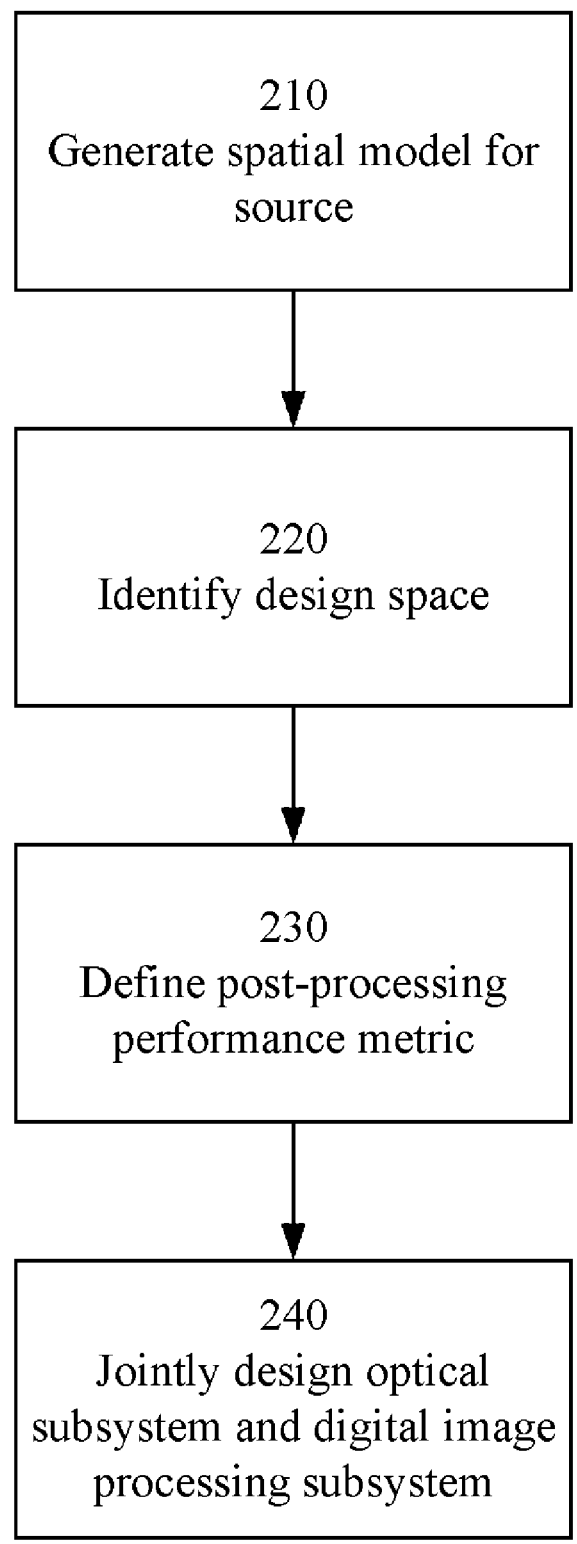
FIG. 2 is a flow diagram illustrating a method for designing an electro-optic imaging system according to the present invention.

FIGS. 1 and 2 illustrate an example method for designing an electro-optic imaging system 100 according to the present invention. Referring to FIG. 2, the design method includes generating 210 a spatial model of the source 150. The spatial model of the source may be derived for a specific situation, empirically measured, based on previously developed models or otherwise provided. Illumination, radiometry and geometry are factors that may be reflected in the source model. The spatial model preferably includes a statistical model of the source.

The design space for the electro-optic imaging system is also defined 220. In FIG. 1, each of the subsystems is defined by its parameters $\theta_o$, $\theta_d$ and $\theta_i$, respectively. For example, the design space for the optical subsystem 110, described by the vector $\theta_o$, may be defined by number, type and size of lenses, radii of curvature, stops, etc. The design space for the detector subsystem 120, described by the vector $\theta_d$, may parameterize the number of pixels, detector spacing, fill factor, bandwidth, pixel geometry, etc. In this particular example, the digital image processing subsystem 130 includes digital filter(s) so the design space for the digital image processing subsystem 130, described by the vector $\theta_i$, may identify the parameters for the digital filter(s) (e.g., number of coefficients, coefficient values, etc). Various non-imaging constraints or costs 170 associated with the designs may also be defined. The size of the design space of each subsystem will vary depending on the application. In some cases, there may be much latitude in designing a subsystem. In other cases, the design of the subsystem may be tightly constrained or even pre-defined (e.g., if the detector array is selected a priori).

A post-processing performance metric 190 is also defined 230. The performance metric is post-processing in the sense that it is based on performance after image processing rather than before image processing. For examples, measures of the wavefront error or spot size of the intermediate optical image produced by the optical subsystem alone may be conventional error metrics for the optical subsystem but they are not post-processing performance metrics. In FIG. 1, the post-processing performance metric 190 is based on a comparison of the digital image 180 produced by the imaging system 100 compared to the ideal digital image 155. In many design situations, the image 180 produced by the system is calculated by modeling propagation of the source characteristics 150 through the subsystems 110, 120 and 130 based on the spatial model of the source.

The design step 240 can be described as selecting a design within the design space that optimizes the post-processing performance metric 190, possibly subject to certain constraints (e.g., limits on the digital filter design). The optical subsystem 110 and the digital image processing subsystem 130 are designed together, rather than sequentially as is the case in conventional design approaches. Mathematically, using the notation of FIG. 1, the design step can be described as selecting the system parameters $\theta_o$, $\theta_d$ and $\theta_i$ to directly optimize the performance metric, possibly subject to certain constraints on the costs 170. For example, an image-based post-processing performance metric 190 may be optimized subject to a maximum financial cost. Alternately, the financial cost may be minimized subject to some minimum acceptable post-processing performance metric 190 for the digital image 180.

A number of optimization algorithms can be used. For some linear cases, parameters may be solved for analytically or using known and well-behaved numerical methods. For more complicated cases, including certain nonlinear cases, techniques such as expectation maximization, gradient descent and linear programming can be used to search the design space.

Note that in both FIGS. 1 and 2, there is no requirement for the optical subsystem 110, the detector subsystem 120 or the digital image processing subsystem 130, taken alone, to be optimal. It is quite possible for these subsystems to exhibit less than optimal performance when considered alone, while the overall electro-optic imaging system 100 still exhibits good or even optimal performance. This is in direct contrast to conventional design methods where, for example, the optical subsystem 110 typically is designed by directly optimizing the image quality of the intermediate optical image formed by it. For example, the optical subsystem 110 may be designed based directly on minimizing the RMS wavefront error or the RMS spot size. In contrast, for the design approach of FIG. 2, the intermediate optical image formed by the optical subsystem 110 may have worse image quality (e.g., as measured by wavefront error or spot size), which is then corrected by the digital image processing subsystem 130. The optical subsystem 110 is not designed based directly on improving the image quality of the intermediate optical image. Rather, it is designed jointly with the digital image processing subsystem 130, based directly on optimizing the post-processing performance metric 190.

The following descriptions provide further examples of models of the source 150, optical subsystem 110, detector subsystem 120 and digital image processing subsystem 130. One specific model (but not the only model) is described, thereby presenting a unified framework for end-to-end performance evaluation.

Beginning with the source 150, the design method of FIG. 2 includes a spatial model of the source 150 when possible. In most scenarios, the universe of all possible source objects to be imaged is naturally constrained by the application. For instance, this universe of objects may be tightly constrained as in the case of a bar code reading system, or rather unconstrained as in the case of a general purpose consumer camera. Be it large or small, the boundedness of this space can offer important prior information for the system designer. For instance, knowing that the source is a binary level scanned document provides powerful constraints and information to the digital image processing subsystem in particular.

In one approach, suppose that there exists a three-dimensional source luminance function, $s_{obj}(x', y', z', \lambda)$, which results from the complex interaction between three-dimensional scene geometry, reflectance, and illumination. In this simplified spatial model, assume that the signal represents the radiant intensity of incoherent light with wavelength $\lambda$ emanating from points in the three dimensional space defined by $(x', y', z')$. The purpose of the electro-optic imaging system 100 is to capture the two-dimensional projection of this source signal.

In one embodiment, the post-processing performance metric 190 is based on a comparison of the actual (or simulated) image 180 to some ideal image 155. The ideal image 155 can be modeled in different ways, one of which is presented below. In this example, the idealized forward model at wavelength $\lambda$ can be modeled as $$s_{ideal}[m, n, \lambda] = [B_T(x, y) * P(s_{obj}(x', y', z', \lambda))]|_{x=Tm, y=Tn} \quad (1)$$
$$= [B_T(x, y) * s_{proj}(x, y, \lambda)]|_{x=Tm, y=Tn}$$
$$= [s_{img}(x, y, \lambda)]|_{x=Tm, y=Tn}$$

where $P(\cdot)$ represents the ideal projective (pinhole) transformation into the image coordinate space $(x, y)$ and $B_T(\cdot)$ is an ideal bandpass filter with cutoff frequency matched to the spatial sampling period T. The indices $(m, n)$ represent the indices of the pixel locations of the final sampled image. Because the ideal image $s_{ideal}$ 155 is the goal for the imaging system 100, the effects of the subsystems are formulated in terms of their effect on the idealized image $s_{ideal}(m, n, \lambda)$. As such, this model distinguishes between the source function s in the three-dimensional object space $s_{obj}$, after being projected onto the image plane $s_{proj}$, after passing through some idealized optics $s_{img}$ and after being sampled $s_{ideal}$. It is often convenient to represent the ordered collection of the samples $s_{ideal}$ by the vector s.

Figure 3:
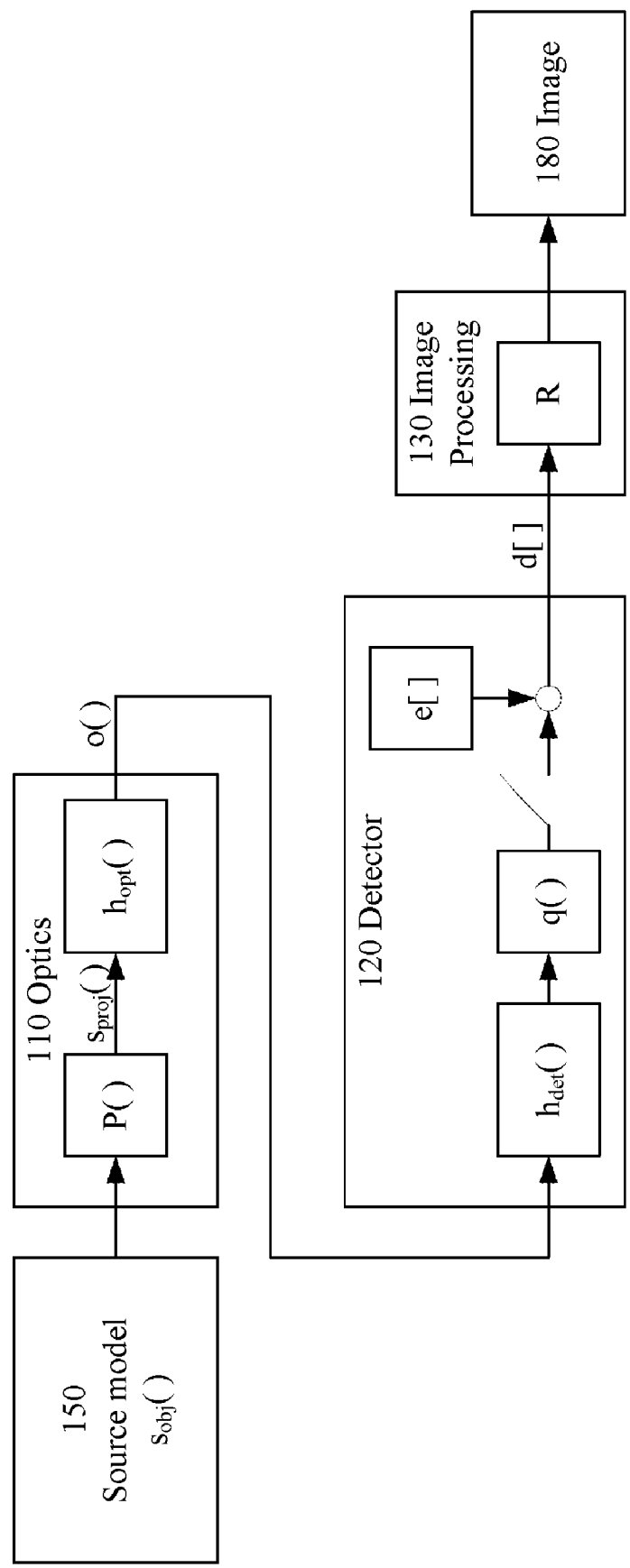
FIG. 3 is a block diagram of a model of an electro-optic imaging system.

Moving now to the actual image 180, FIG. 3 is a block diagram of a model of the electro-optic imaging system that produces the actual image 180. Information used to produce the spatial model of the source 150 may take several forms. For example, the designer may possess detailed information about the three-dimensional geometry of the scene under consideration. The spatially varying luminance properties of the scene may also be used to model the source 150. For instance, when dealing with text or textual document images, the designer may have information relating to the language of the imaged text, or that the signal represents a binary source, etc. In one approach, the information about the source signal is assumed to be statistical in nature and is modeled by a power spectral density function. Such information might be extracted from a corpus of objects representative of the sources to be imaged by the fielded system or modeled from physical first principles. This knowledge can be especially useful in designing the digital image processing subsystem. Many image processing techniques rely on prior information regarding the contents of the scene under observation as imaged by an idealized imaging system.

Moving now to the optical subsystem 110, for a particular wavelength of light λ the forward optical imaging model can be expressed as $$o(x,y) = \int h_{opt}(x,y,\tilde{x},\tilde{y}) s_{img}(x,y) d\tilde{x} d\tilde{y} \quad (2)$$

where o(x, y) is the optical image after the ideal projected optical image $s_{img}(x, y)$ (produced by the projective transformation P( )) is blurred by the spatially varying point spread function (PSF) $h_{opt}(x, y, \tilde{x}, \tilde{y})$. The digital image d[m, n] after being sensed by the photodetector 120 is given by $$d[m,n] = q(\int h_{det}(x-\tilde{x}, y-\tilde{y}) o(x,y) d\tilde{x} d\tilde{y})|_{x=Tm,y=Tn} + e[m,n] \quad (3)$$

where $h_{det}(x, y)$ is the spatially invariant detector integration function, T is the pixel separation or spatial sampling rate, q( ) is the quantization associated with the detector, and e[m, n] is the random noise associated with the detection process.

This forward model can be approximated by the linear model $$d = Hs + e \quad (4)$$

where s is the vector of samples of the bandlimited input image $s_{ideal}[m, n]$, H is the matrix representing the cumulative effects of both the optical point spread function $h_{opt}(x, y, \tilde{x}, \tilde{y})$ and the sensor integration function $h_{det}(x, y)$, and e represents the additive random noise due to the detector. The units m and n represent the indices after sampling. The form of Eqn. 4 is useful primarily as a simplified representation. The actual simulation need not explicitly construct such matrices.

The effects of the digital image processing subsystem 130 are also modeled. In this example, the image processing is constrained to be linear, where the final image is thus given by $$\hat{s} = Rd \quad (5)$$

where R is the matrix describing the linear image processing.

Eqn. 5 was developed for a single wavelength. This is adequate for monochromatic systems which operate at a single wavelength. For systems which operate over a wavelength band but only produce a single output signal, the equations developed above can be integrated over the wavelength band. The monochromatic model can be extended to color imaging systems (i.e., systems which produce more than one output signal—for example separate R, G and B signals) in a number of different ways. The color images can be computed as $$d(l) = H(l)s(l) + e(l) \quad (6)$$

where the index l indicated different color bands and the quantities may be integrated over the wavelength band of interest, including for example the wavelength sensitivity of the photodetector. In one approach, each color band is designed separately with respect to the digital image processing subsystem. Each color image d(l) is processed by its own wavelength-dependent digital filter R(l), which can be different for different color bands. Thus, each color channel can be optimized with some independence. In an alternate approach, a single wavelength-independent digital filter R is applied to all color channels. For convenience, the remaining disclosure addresses the monochromatic case, with the understanding that this can be extended to polychromatic systems.

Figure 4:
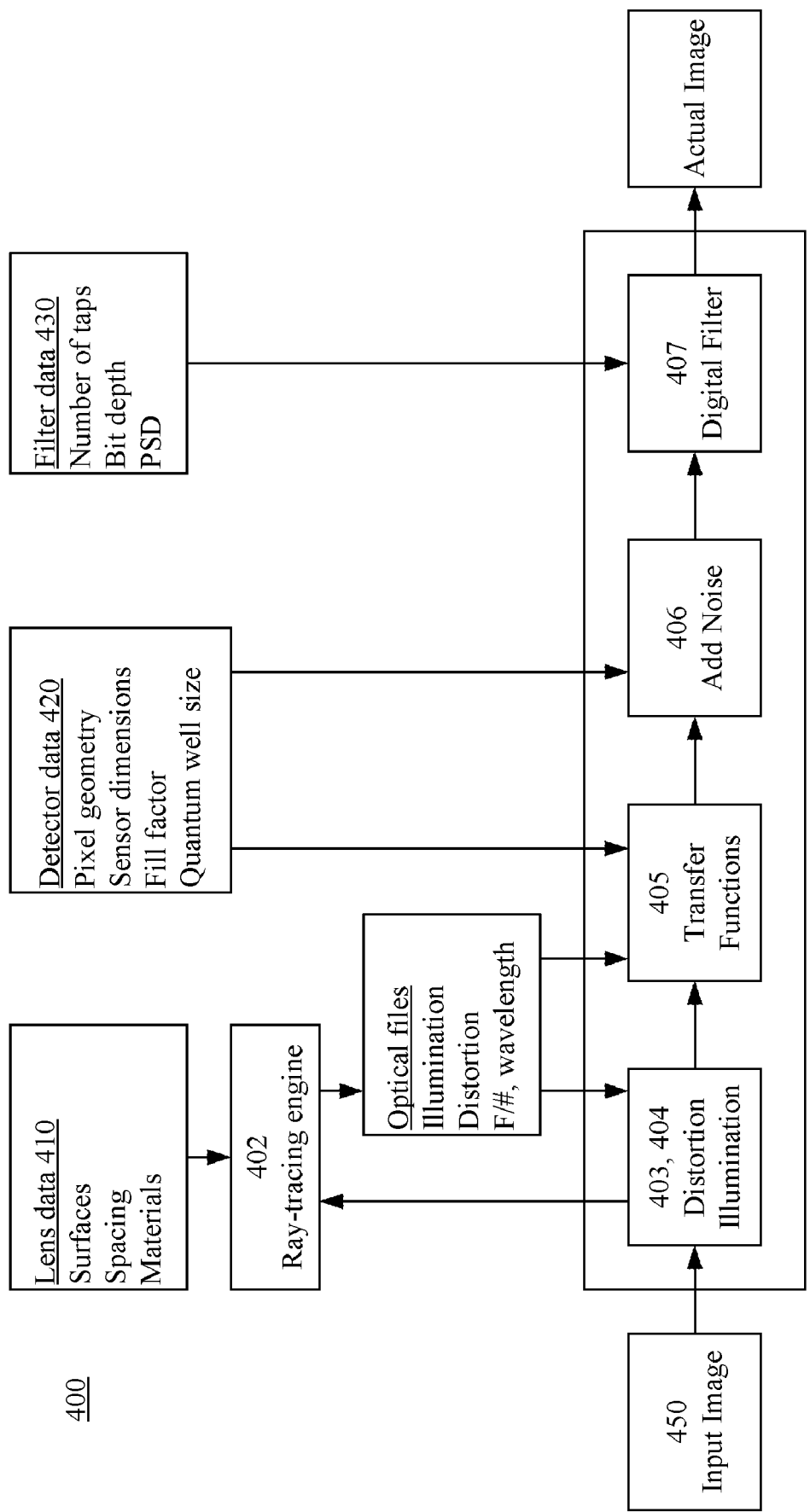
FIG. 4 is a block diagram of one software implementation of the model of FIG. 3.

FIG. 4 is a block diagram of a software architecture for implementing the propagation model shown in FIG. 3 and Eqns. 4-6 above. The software 400 takes the following inputs:
  input image file 450 describing the input image s 150
  lens design file 410 describing the optical subsystem 110
  detector file 420 describing the detector subsystem 120
  filter file 430 describing the digital filter 130

These are shown as separate files for convenience but the information may come in different forms and file formats.

The software 400 includes modules for the following functions: ray tracing 402, distortion 403, illumination (e.g., vignetting) 404, transfer functions/point spread functions 405, noise 406, and digital filtering 407.

The software 400 operates as follows. The ray tracing engine 402 ray traces the optical subsystem specified in the len design file 410 to compute the optical properties needed to compute the matrix H. Modules 403-406 apply this model to the source s specified in input image file 450 to produce the sensed image d. Module 407 applies the linear digital filter R to produce the final output image s.

For large images, explicitly constructing the matrices H and R may be unfeasible. Various simplifications can be used to improve the computational efficiency. For example, the optical effects of illumination variation (e.g., vignetting) and distortion can be separated from those related to blurring. In both the forward optical model as well as the image processing model, these affects are applied sequentially. For example, the optical channel matrix H can be separated into the three components $$H = H_{blur} H_{illum} H_{dist} \quad (7)$$

where $H_{blur}$ captures the convolution of the image with the optical/sensor PSF (implemented by module 405), $H_{illum}$ is a diagonal matrix capturing the illumination change over the image field due to vignetting (module 404), and $H_{dist}$ represents the image warping due to optical distortion (module 403). In addition, the spatially-variant PSF $h_{opt}(x, y, \tilde{x}, \tilde{y})$ can be approximated as piecewise invariant. The image space is divided into tiles, each covering a certain area in ($\tilde{x}, \tilde{y}$) space, and the PSF is modeled as spatially invariant within each tile. Thus, the overall PSF is modeled by a set of spatially-invariant point spread functions $h_{opt}(x, y, u)$ where the u identifies the area over which that spatially invariant PSF applies. This approach supports convolution in the frequency domain in an efficient manner using the Fast Fourier Transform (FFT).

In more detail, consider first the optical distortion $H_{dist}$. The ray tracing engine 402 determines the geometrical distortion in the lens design, which is a mapping between paraxial (undistorted) image coordinates and actual (with distortion) image coordinates. Note that the detector is located in actual image space but the undistorted image $s_{ideal}$ is located in paraxial image space because it is a geometrical projection assuming no distortion. To account for this, module 403 distorts the image $s_{ideal}$ so that the points (mT, nT) in the distorted version of $s_{ideal}$ are the actual points in the undistorted version of $s_{ideal}$ that would fall on detector[m, n]. Explained in another way, the actual image is laid out in a regular grid with respect to the distorted image coordinates (mT, nT). The software determines the undistorted coordinates corresponding to this set of actual distorted coordinates.

In one approach, the distortion mapping from paraxial coordinates to actual coordinates is approximated as a cubic function. Furthermore, the distortion is assumed to be small so that the inverse mapping can also be modeled as a cubic (as opposed to strictly inverting the cubic). Other approaches can also be used. For example, the distortion mapping function can be represented by sample points and then interpolated to get the inverse mapping. This mapping is then used to construct $H_{dist}$. The rows of the matrix $H_{dist}$ are comprised of the coefficients of the linear interpolation kernel. The coefficients are defined by the distance between the desired sample location and the actual sample locations in $s_{ideal}$.

Vignetting and other illumination effects are accounted for by $H_{illum}$. In image space, these illumination effects manifest themselves as a spatially varying gain factor, which can be implemented as the diagonal matrix $H_{illum}$. The actual gains are determined by the ray tracing engine 402. In one approach, the gain factor is modeled as a rotationally symmetric polynomial (i.e., a polynomial in radius r).

$H_{blur}$ accounts for the spatially varying blur or point spread function (PSF) associated with the optics and the photodetector. The blurring operation is the combination of both the blurring due to the optical system $h_{opt}(x, y, \tilde{x}, \tilde{y})$ as well as the spatial integration due to the geometry of photo-detector pixels $h_{det}(x, y)$. While the blurring of the photo-detector is spatially-invariant, the blurring of the optics typically is a field-dependent characteristic. To simulate the full imaging system to a high accuracy, this spatially varying PSF must be accurately modelled. Unfortunately, explicitly computing and applying a different PSF for each pixel usually is computationally infeasible.

In an alternate approach, the spatially varying point spread function PSF $h_{opt}(x, y, \tilde{x}, \tilde{y})$ is approximated by a PSF composed of tiles within which the PSF is approximated as spatially invariant. In one implementation, each tile, defined by index u, is a square having dimensions D×D pixels. By approximating the PSF with spatially-invariant tiles, the blurring operation can be efficiently implemented in the frequency domain using FFTs rather than performing explicit spatial-domain convolution. Each D×D image tile is padded with ±P pixels of image data creating a larger image tile of dimension B×B. At the edges of the input image, the padding takes the form of reflected image data. This image tile is converted into the frequency domain using an FFT and multiplied by the total transfer function (TTF) $H_{blur}(U)$ for this particular tile u. After an inverse FFT, the blurred image data is written to the output image at the tile indices u.

The tile size D is an input parameter to the simulation. Smaller D improves the accuracy of the tile-based approximation to the spatially varying PSF at the expense of increased computational complexity. The amount of padding P needed to prevent tiling artifacts in the tile-based approximation is also an input parameter to the simulation. The amount of padding typically should be at least as large as the PSF. In general, the PSF for an optical system typically is not very large in size. This padding, however, becomes important when performing subsequent image processing where the digital filters may be large in spatial extent. If P is too small, tiling artifacts will dramatically reduce the accuracy of the tile-based approximation to the spatially varying process.

The total transfer function mentioned above is the transfer function taking into account both the optical subsystem and the detector subsystem. It can be computed as follows:
1. Calculate the optical path difference (OPD) function (size L×L)
2. Pad the OPD function with zeros (size 2 L×2 L)
3. Compute the FFT of the OPD tile and square the magnitude to produce the PSF (size 2 L×2 L)
4. Compute the FFT of the PSF to produce the OTF (size 2 L×2 L)
5. Crop the OTF at the detector sampling frequency (size K×K)
6. Multiply the scaled OTF by the sensor transfer function to produce the total transfer function (TTF) (size K×K)
7. Scale the cropped TTF to the desired tile size (size B×B)
8. Normalize the TTF to have unity gain.

The final normalization ensures that the TTF has unitary DC gain, which would otherwise depend on the dimensions of the tiles during the FFT operations.

The ratio of the cropped OTF size to the full OTF size, K/2 L, is equivalent to the ratio of the Nyquist spatial frequency for the detector to the full diffraction limited spatial frequency for the optics. In cropping the OTF to the Nyquist frequency, two implicit assumptions are made. First, the input image is assumed to represent the samples of a bandlimited function. Second, the input image is assumed to have the same number of pixels as the detector. In other words, the input image has a sampling rate equivalent to the Nyquist rate. These assumptions ignore aliasing effects, although alternate approaches can account for these effects. For example, the input image could be some multiple number of pixels of the sensor, in which case the optics are simulated above the Nyquist frequency and then downsampled during the digitization simulation to model the effects of aliasing.

Turning now to the noise module 406, in one approach, the noise is modelled as an additive Gaussian noise. In one model, the additive noise is assumed to be white Gaussian noise with variance $\sigma^2$ independent of the (x, y) position. The noise power or variance is entered as a simulation parameter by way of the noise power spectral density function (PSD). The PSD may be used to correlate or shape the noise. Alternately, the noise can be modeled using a random number generator.

In an alternate model, the additive Gaussian noise has a variance which is spatially varying and depends on the gray level associated with the particular pixel. In this case, Gaussian noise statistics are used to simulate photon noise in a high-photon regime. The noise variance for a particular pixel is given by $$\sigma^2[m, n] = s[m, n]\frac{2^b}{Q} \qquad (8)$$

where s[m, n] is the simulated sampled image after accounting for distortion, relative illumination, and blurring, b is the bit depth of the detector (6, 8, 12, etc.), and Q is the quantum well size for a particular pixel. Both b and Q are inputs to the simulation software. Thus, as the size of the quantum well of the detector increases, the shot noise power is decreased and vice-versa.

Moving to module 407, the digital image processing effects can also contain multiple stages: deblurring, distortion compensation and spatial equalization, for example. In this example, the observed image is first deblurred using spatially varying digital filters. Then, distortion compensation and spatial equalization are applied.

Deblurring is achieved using the same segmented approach described previously for the PSF. The image space is divided into filter domains and the digital filter is spatially invariant within each filter domain. That is, the same filter kernel $R[(\omega, v, u]$ is applied to all image points within the filter domain. Here, [ω, v] are the spatial frequency indices and u indicates the filter domain. In one approach, the digital filter for a particular domain is $$R_{blur}[\omega, v, u] = \frac{H^*[\omega, v, u]S[\omega, v]}{|H[\omega, v, u]|^2 S[\omega, v] + E[\omega, v]} \qquad (9)$$

where $H[\omega, v, u]$ is the TTF for the uth filter domain, $S[\omega, v]$ is the power spectral density (PSD) for the source image, and $E[\omega, v]$ is the PSD for the noise.

The spatial extent of the digital filters R are often much larger than the spatial extent of the point spread functions. For this reason, the padding should be significantly larger for modeling of the digital image processing subsystem than for modeling of the optical subsystem.

Distortion correction and spatial equalization can be used to counteract the effects of vignetting and distortion. For example, the portions of the image that suffer from lower illumination due to vignetting can be digitally amplified relative to other portions. Geometrical distortion can be removed or reduced by any number of conventional techniques.

The techniques described above can be used to calculate the ideal image s 155 (see Eqn. 1) and the actual image ŝ 180 (see Eqn. 5). Referring to FIG. 1, a performance metric 190 is calculated comparing the ideal image and actual image. Different performance metrics can be used.

One performance metric is the RMSE between the ideal image $s_{ideal}[m, n, \lambda]$ and the (simulated) actual images $\hat{s}[m, n, \lambda]$, which is given by $$RMSE = \sqrt{\frac{1}{N} \sum_i \|s(\lambda_i) - \hat{s}(\lambda_i)\|^2} \quad (10)$$

where N is the total number of pixels in the images for all color channels combined and $\lambda_i$ indicates different color channels.

One drawback of RMSE as a performance measure is its sensitivity to registration or misalignment errors. For instance, a simple global shift of the image could show very poor RMSE performance. While such registration or line-of-sight (LOS) errors may be important for some applications, for many imaging applications, the resolution capabilities of the imaging system are of greater interest. Therefore, an alternate performance metric is the RMSE between the ideal image after distortion and the restored image before distortion correction (thus eliminating spatial shifts due to distortion). This is given by $$RMSE_{intermediate} = \sqrt{\frac{1}{N} \sum_i \|H_{illum} H_{dist}(\lambda_i) s(\lambda_i) - R_{blur}(\lambda_i) d(\lambda_i)\|^2} \quad (11)$$

Figure 5:
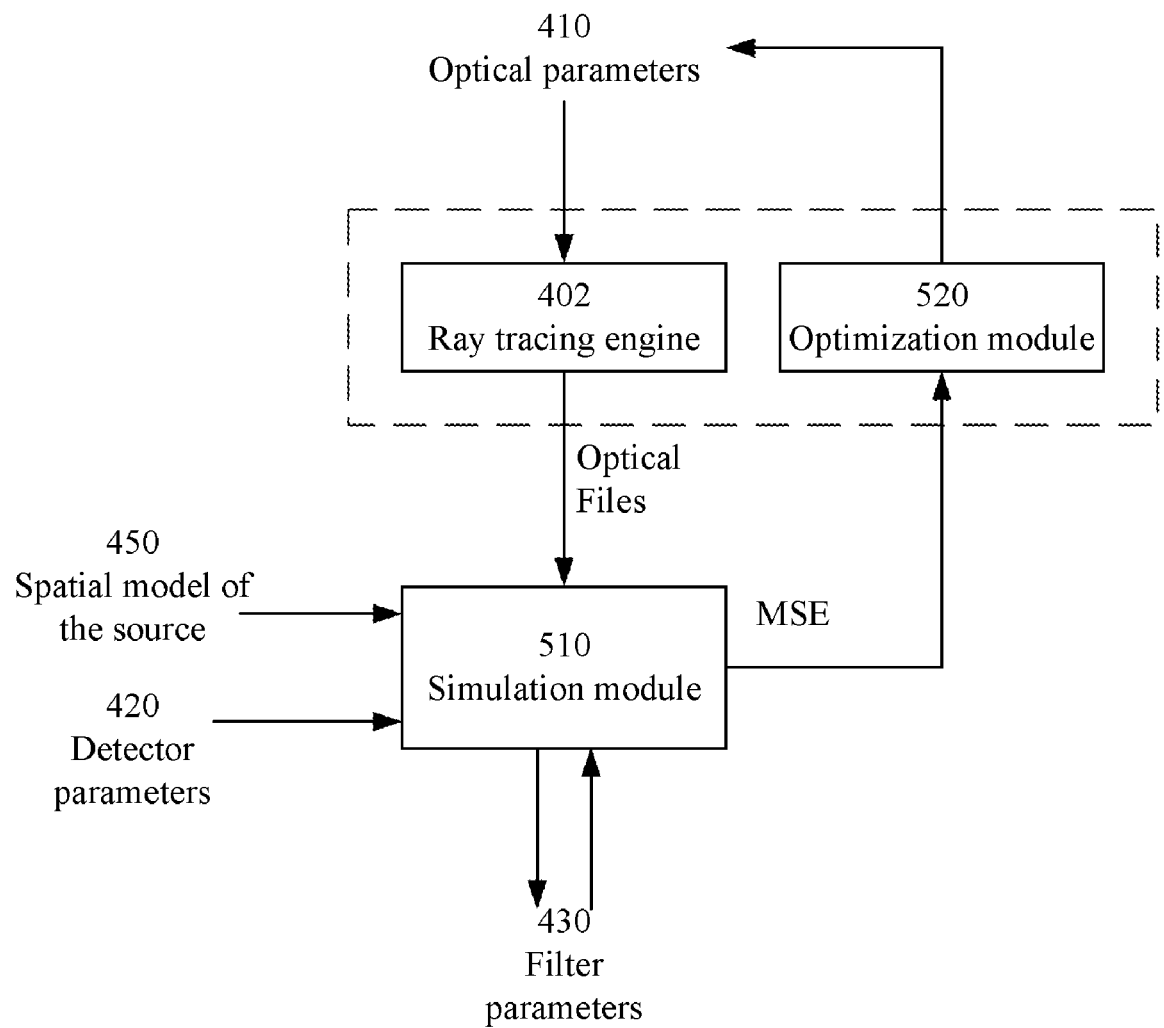
FIG. 5 is a block diagram of one software implementation of the end-to-end design approach.

FIG. 4 and the above discussion illustrated one approach for software modeling of propagation of the source through the electro-optic imaging system. This software 400 has the capability to analyze the digital image 180 and/or RMSE associated with a particular optical design 410 and digital filter design 430. FIG. 5 is a block diagram illustrating one software implementation that uses this analysis capability to optimize the optical design 410 and digital filter design 430.

In FIG. 4, the ray tracing engine 402 was based on a commercially available lens design program, such as Zemax. These programs typically have ray tracing capability 402 as well as optimization capability 520, as indicated by the dashed box in FIG. 5. The implementation of FIG. 5 takes advantage of these built-in ray tracing and optimization functions and optimizes the optical design 410 with respect to the RMSE (or other post-processing performance metric that takes into account the entire electro-optical system). Specifically, the output of the ray tracing engine 402 are optical files that are passed to module 510. Module 510 includes modules 403-407 from FIG. 4 and also includes a module to calculate the performance metric.

Module 510 itself may have self-contained loops or optimizations. For example, the design of the digital filter may be an iterative optimization that occurs within module 510. Module 510 outputs the post-processing performance metric, which is used by the optimization module 520 to iterate the design of the optical subsystem. Note that the design of the digital image processing subsystem changes as the design of the optical subsystem changes. Different image processing is used to compensate for different errors introduced by different optical subsystems. Thus, the optical subsystem and the digital image processing subsystem are jointly designed based on the post-processing performance metric. For example, the design software may generate filter coefficients, as well as the final optical subsystem design.

FIG. 5 is just one example implementation, which is driven primarily by the availability of ray tracing and optimization modules 402 and 520 in commercially available lens design programs. Other implementations will be apparent.

Continuing the example of FIG. 4, the design optimization is implemented as follows. The image field is divided into U tiles. Increasing the number of tiles increases the accuracy of the optimization but can slow down the computational speed of the optimization. Symmetry can be used to reduce the computational burden. To predict the RMSE performance, the total transfer function (TTF) is computed for different tiles, as described above. As before, information about the OPD sampling resolution, tile size, detector properties and PSD images are stored in separate files which are accessed by the software. The OPD functions produced during optimization differ in one respect from those produced during simulation. In this implementation, the OPD functions produced for optimization have the tilt removed. Removing the tilt essentially ignores the line-of-sight errors introduced by the optics, on the assumption that, for the most part, such shift errors can be corrected with image processing. This particular implementation is more focused on the resolution degradation due to spatial blurring.

For each tile, the MSE is calculated assuming that the tile is filtered using the appropriate Wiener filter. To reduce computations, the MSE in this case can be predicted without having to explicitly compute the Wiener filter. For any particular tile, the predicted MSE is given by $$MSE_{pred}(u) = \frac{1}{B^2} \sum_{\omega,v} \frac{S[\omega, v] E[\omega, v]}{|H[\omega, v, u]|^2 S[\omega, v] + E[\omega, v]} \quad (12)$$

where the PSD images are B×B pixels in size The TTF H[ω, v, u] is scaled to match the PSD image sizes. Once the predicted MSE is computed for each of the field locations, the overall RMSE is predicted by $$RMSE_{pred} = \sqrt{\frac{1}{U} \sum_u MSE_{pred}(u)} \quad (13)$$

which is then passed to the optimization module 520, which uses its own internal searching routines to optimize the optical design based directly on the post-processing performance metric. Eqn. 12 assumes a one to one correspondence between filter domains and tiles. More generally, a single filter domain may include several tiles. In that case, the MSE predicted by Eqn. 18 is more appropriate.

The example above was based on Wiener filtering and assumes that the digital filter can be infinite in size. One advantage of this case is that the filtering can be performed efficiently using FFTs. However, in many systems, the filtering may be performed by direct convolution with the filter kernel(s). For these cases, filter kernels with larger footprints (i.e., larger number of non-zero coefficients) require more computations. One way of reducing the computational complexity is to constrain the size of the filter kernel(s).

Figure 6:
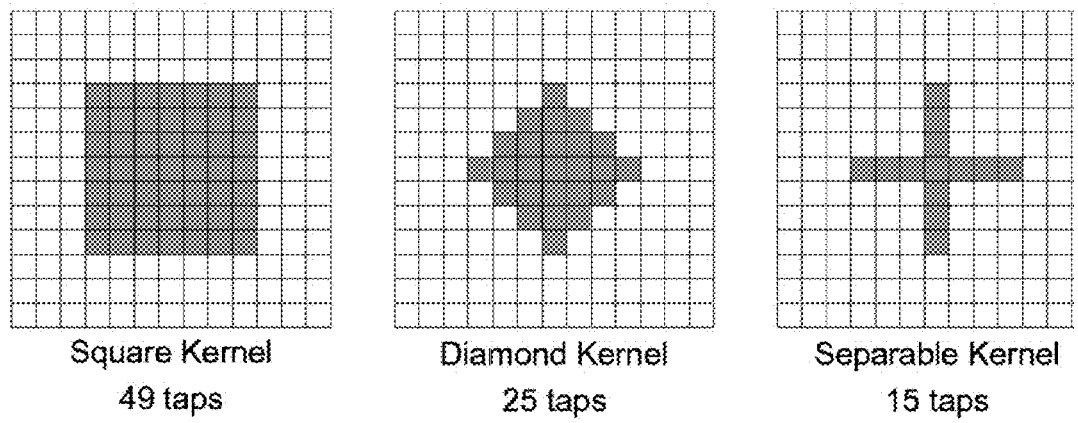
FIG. 6 shows three examples of filter kernels with different footprints.

For instance, FIG. 6 shows three filter kernels with different footprints. Each square represents an image pixel and the shaded squares are non-zero coefficients. FIG. 6 also lists the number of coefficients for each kernel. Since the number of arithmetic operations, and hence the memory requirements, typically scale linearly with the number of filter coefficients, limiting the filter size is important to increasing the computational speed of the digital image processing subsystem.

Finite size filters cannot implement the Wiener spectral response given in Eqn. 9. As a result, it is often advantageous to design the digital filter in the spatial domain instead. In the spatial domain, finding the MSE minimizing filter is equivalent to solving the set of equations $$a_{ds}[k, 1] - \sum_{m,n \in \kappa} r[m, n] a_{dd}[k - m, 1 - n] = 0, \forall [k, 1] \in \kappa \quad (14)$$

where $\kappa$ defines the footprint of the filter kernel, $a_{ds}$ is the correlation function between d[m, n] and s[m, n] and $a_{dd}$ is the autocorrelation function of d[m, n].

The MSE minimizing filter coefficients can be found by solving a linear system of equations of the form $$Ar = b \quad (15)$$

where A is a block Toeplitz matrix representing the equations defined by Eqn. 14. To construct the matrix, the two-dimensional filter is first ordered to convert it to a one-dimensional vector. For example, suppose the digital filter is constrained to be a square filter of size [−W, W]×[−W, W] pixels. One ordering is based on a raster scan of the filter coefficients [−W, W], [−W+1, W], . . . , [W, W]. In this case, the A and b terms are constructed as $$A = \begin{bmatrix} a_{dd}[0, 0] & a_{dd}[-1, 0] & \cdots & a_{dd}[-2W, -2W] \\ a_{dd}[1, 0] & a_{dd}[0, 0] & \cdots & a_{dd}[-2W+1, 2W] \\ \vdots & \vdots & \ddots & \vdots \\ a_{dd}[2W, 2W] & a_{dd}[2W-1, 2W] & \cdots & a_{dd}[0, 0] \end{bmatrix} \quad (16)$$

$$b = \begin{bmatrix} a_{ds}[W, -W] \\ a_{ds}[-W+1, -W] \\ \vdots \\ a_{ds}[W, W] \end{bmatrix}$$

The correlation functions $a_{ds}$ and $a_{dd}$ can be computed efficiently using FFTs where $$a_{ds}[m,n] = \mathrm{Re}\{FFT^{-1}\{S[w,v]H[w,v]\}\}$$

$$a_{dd}[m,n] = \mathrm{Re}\{FFT^{-1}\{S[w,v]|H[w,v]|^2 + E[w,v]\}\} \quad (17)$$

The correlation functions are computed for each tile u since they depend on the OTF, which varies from tile to tile.

One important factor to consider when designing constrained filters involves the spatial shifts associated with the optical PSF. The ability of the digital filter to compensate for optical blurring can be hampered if it must also compensate for spatial shift. To increase the utility of a size-constrained filter, the spatial shifts of an optical PSF preferably are removed prior to the filter design. Hence, as described previously, any spatial shifting (or, equivalently, linear phase in the OTF) is ignored when designing the digital filter. This is equivalent to centering the digital filter on the centroid of the optical PSF. In one approach, the PSF pixel with the greatest magnitude is used as the centroid of the PSF. In an alternate approach, the slope of the imaginary portion of the OTF through the origin can be used to estimate the centroid.

Figure 7A:
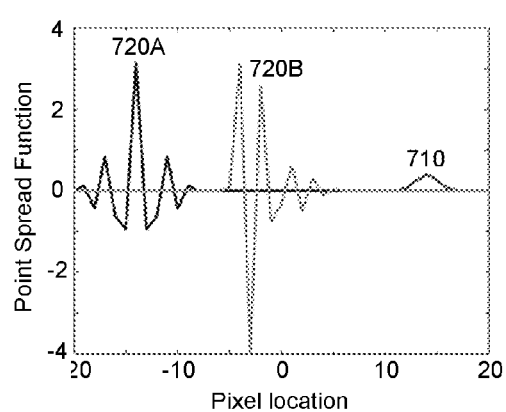
FIGS. 7A-7B are graphs illustrating the effect of removal of spatial shift on design of a size-constrained digital filter.
Figure 7B:
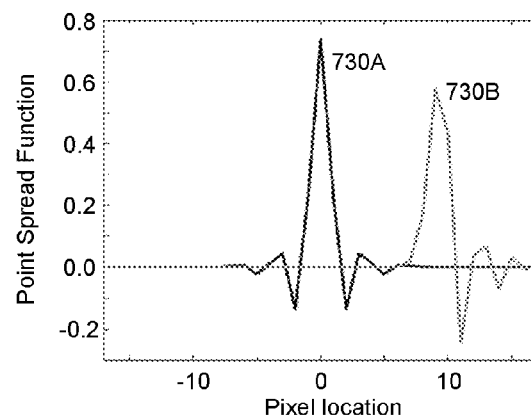

FIGS. 7A-7B illustrate this effect. Curve 710 in FIG. 7A shows an optical PSF with a significant amount of spatial shift (about 15 pixels). For comparison, an ideal PSF would be a delta function centered at the origin $\delta[m]$. Curve 720A shows the MSE-minimizing filter that results when the 15-pixel spatial shift for the PSF 710 is first compensated, and the digital filter is then designed based on the PSF after removal of the spatial shift. The curve 720A has been shifted by 15 pixels in the reverse direction to visualize the effective digital filter. Curve 720B shows the MSE-minimizing filter that results when the spatial shift has not been removed prior to filter design. This uncompensated filter 720B must therefore both remove the spatial shift and restore the blurred image. In FIG. 7B, curves 730A and 730B show the PSF for the system after (a) spatial shifting and filtering by 720A and (b) filtering by 720B, respectively. The uncompensated filter 720B not only fails to correct the spatial shifting but also does a poor job of correcting the optical blur.

Once the MSE minimizing filters have been designed, the MSE is predicted by $$MSE_{pred}(u) = \frac{1}{B^2} \sum_{\omega,v} [S[\omega, v]|H[\omega, v, u]R[\omega, v, u] - 1|^2 + E[\omega, v]|R[\omega, v, u]|^2] \quad (18)$$

where $R[\omega, v, u]$ is computed by taking a zero-padded FFT of the constrained filter r[m, n, u].

Shrinking the size of the filter kernel generally reduces the effectiveness of the filter in correcting the aberrations introduced by the imaging optics. Generally speaking, increasing the number of coefficients results in a digital filter that is a better approximation to the ideal Wiener filter, thus resulting also in lower MSE. However, the performance is not strictly a function of the number of coefficients (taps) in the digital filter. The filter footprint plays an important role as well. For instance, referring to FIG. 6, the filters shown in FIG. 6 typically would not have the same performance, due to the differently shaped footprints, even if they are sized so that each filter has the same number of coefficients.

Optimizing the filter footprint and/or coefficients can be achieved in a number of different ways. One simple heuristic uses the magnitude of the optimal filter coefficients to choose which coefficients to remove from the filter footprint. An equal number of randomly selected coefficients are added to the footprint to replace the removed coefficients. If the filter improves, then the change is kept. Otherwise, it is discarded. The process iterates to optimize both the footprint and the coefficients while limiting the total number of filter coefficients.

Figure 8A:
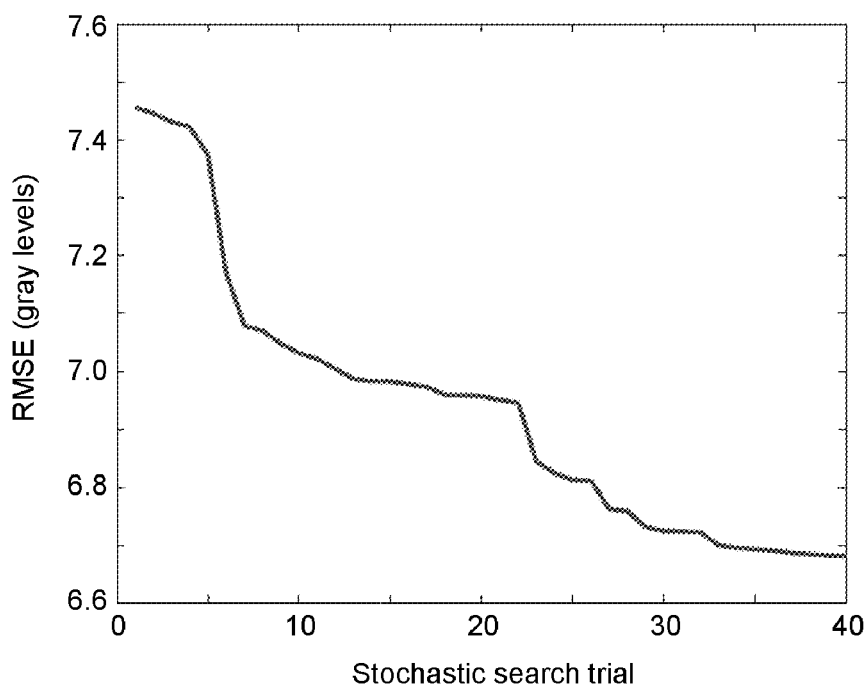
FIGS. 8A-8B are graphs illustrating optimization of a size-constrained digital filter.
Figure 8B:
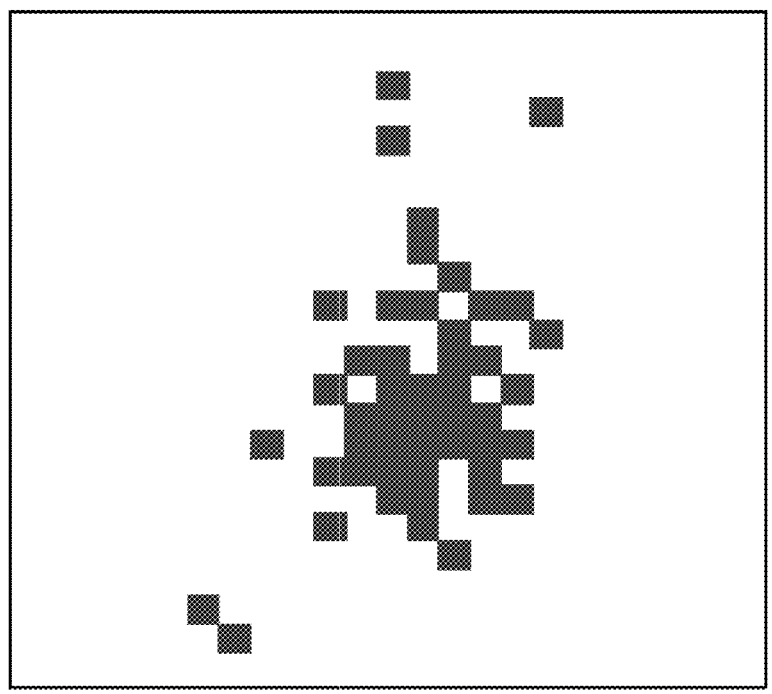

FIGS. 8A-8B show an example. In this example, the optical PSF is asymmetric, with some coma aberration. Most of the energy is concentrated in a 7×7 box. The digital filter is limited to a total of 49 coefficients. The search was initialized with a square 7×7 filter and the footprint was constrained to a square 25×25 bounding box. The design approach described above was applied, replacing two coefficients at a time. FIG. 8A graphs the RMSE as a function of the iteration. The RMSE is reduced by about 15% as a result of the random search. FIG. 8B shows the footprint of the final filter design. Note that the footprint is not contiguous; it is disjoint.

The above discussion gave some examples of how to design finite-sized digital filters. However, the general design problem concerns the design of an overall electro-optic imaging system, including both the optical subsystem and the digital filters. In cases where the digital filter is size constrained, designing the optical subsystem assuming a Wiener filter may lead to a sub-optimal overall design.

Figure 9A:
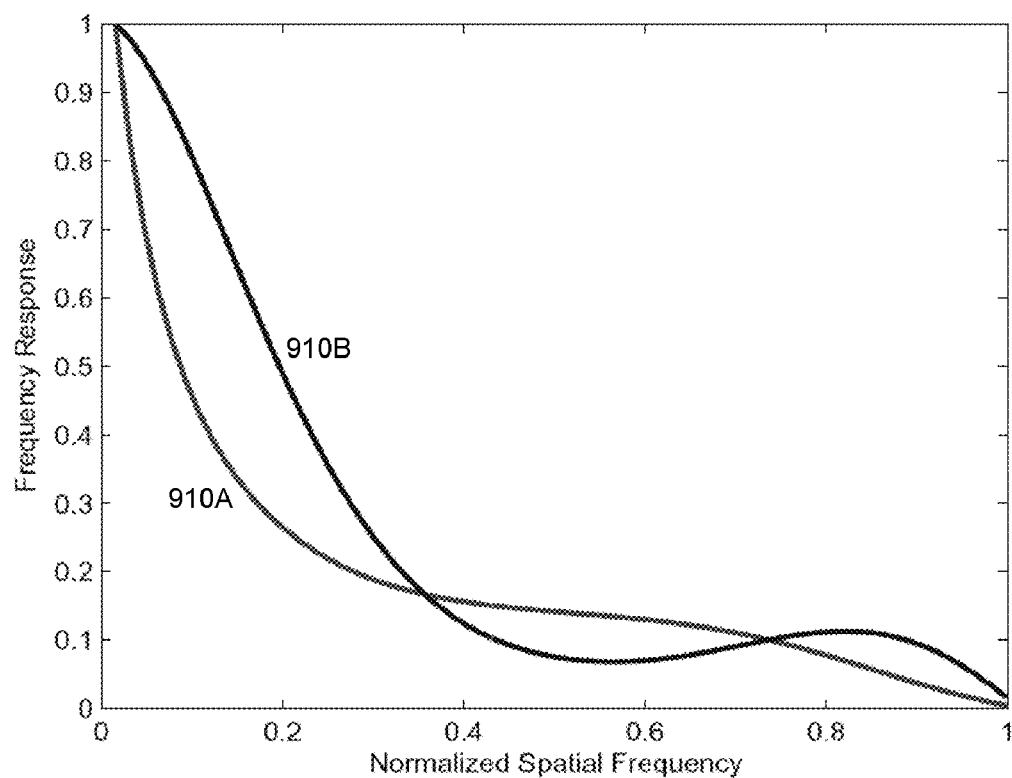
FIGS. 9A-9B are graphs illustrating joint design of an electro-optic imaging system with a size-constrained digital filter.

For example, FIG. 9A shows two similar total transfer functions $H_A(\omega)$ 910A and $H_B(\omega)$ 910B. If Wiener filtering is used, Eqn. 12 predicts a RMSE performance of 15.7 gray levels of error for system A and 18.1 gray levels of error for system B. If there are no size constraints on the digital filter, system A would have lower RMSE than system B.

Figure 9B:
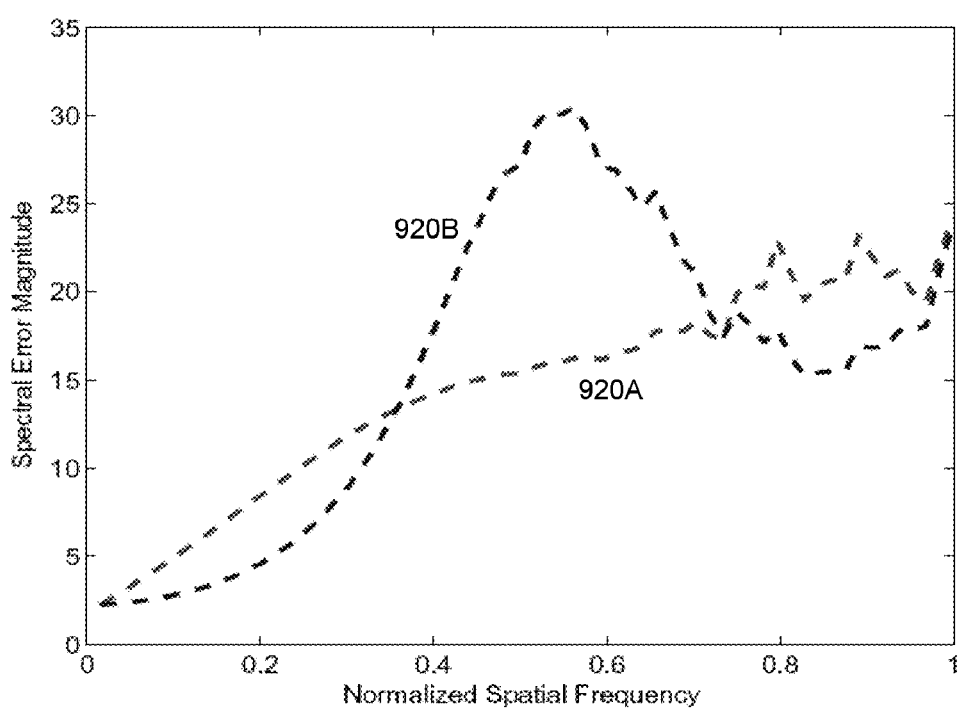

However, the situation is reversed if the filter size is constrained to 15 coefficients. In that case, the performances predicted by Eqn. 18 are 53.7 and 23.2 gray levels of error, respectively. In other words, even though system A suggests superior overall performance for large filters, when the filter is size-constrained, the predicted performance of system B is twice that of system A. This can be explained in part by the spectrum of the expected overall (optics and image processing) system error. This corresponds to the square-root of the summand in Eqn. 18. FIG. 9B shows the shows the error spectrum for the system with Wiener filtering. Curve 920A is the error spectrum for system A and curve 920B is the error spectrum for system B. System B has less error at lower frequencies but more error around the normalized spatial frequency $\omega=0.5$. When all frequencies are taken into account, system A has less error overall. However, when the digital filter is limited in size, the difficulty in restoring the low spatial frequency image content for system A penalizes the predicted RMSE performance. This explains the improved performance of system B when the filter size is constrained.

Figure 10A:
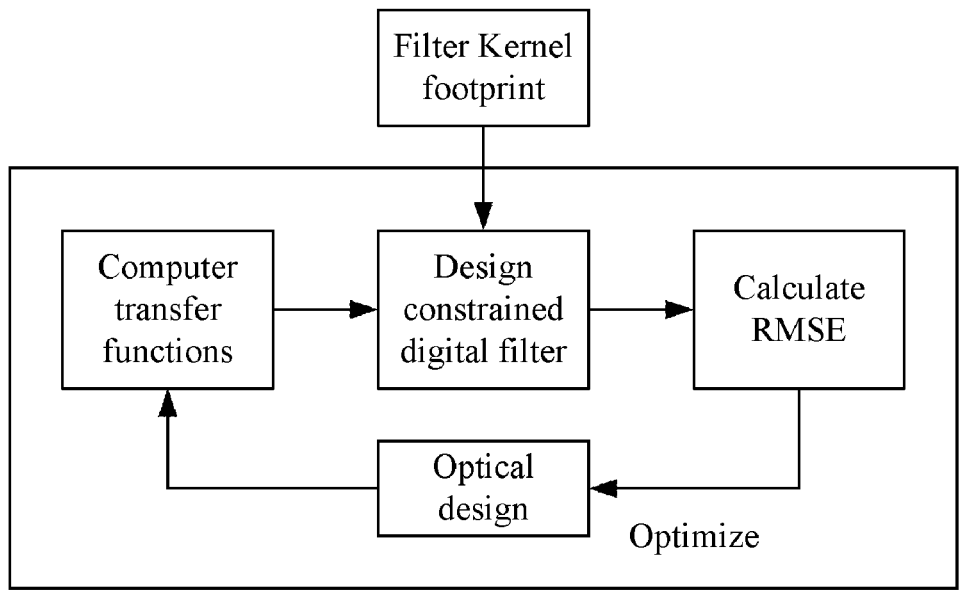
FIGS. 10A-10B are block diagrams illustrating different ways to design a size-constrained digital filter.
Figure 10B:
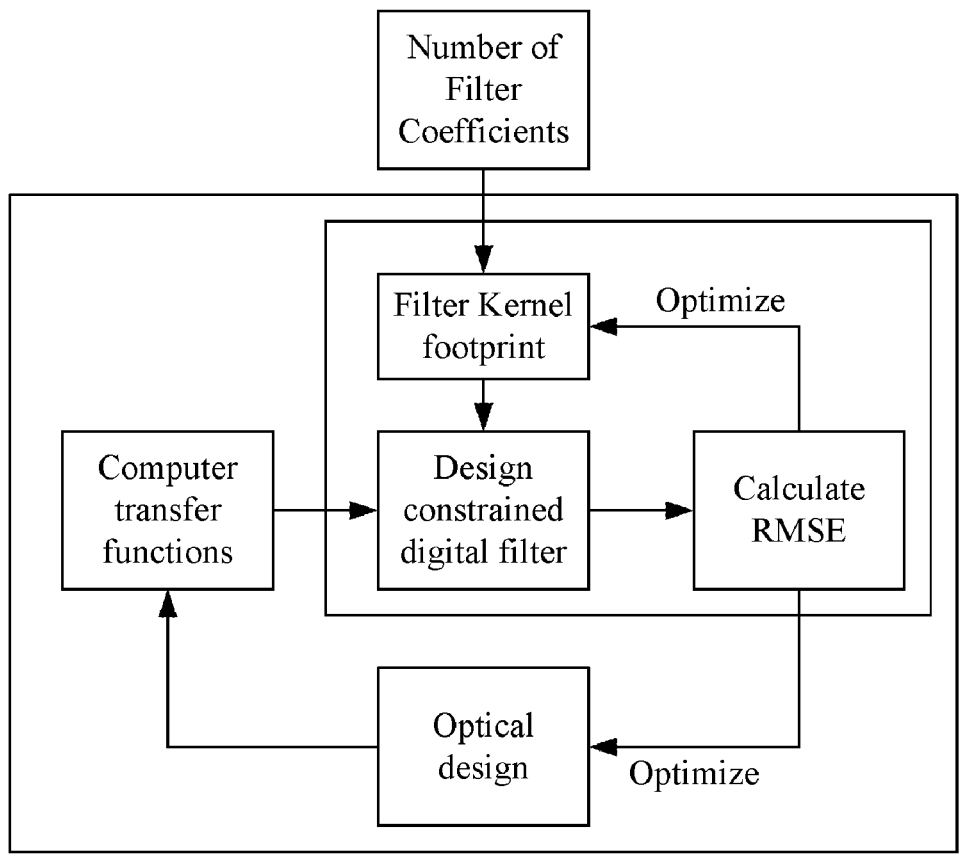

Optimizing the filter footprint and/or coefficients can be achieved in a number of different ways. FIGS. 10A-10B are block diagrams illustrating different types of filter constraints and optimizations. In FIG. 10A, the optical design and filter coefficients are jointly designed, given a fixed filter footprint. At each step in the optimization, the MSE optimal filter with the given footprint is designed and the end-to-end image RMSE is predicted. The optimization cycles through this process changing the optical design to perform the joint design. In FIG. 10B, the total number of filter coefficients is constrained but the shape of the footprint is not. The filter kernel footprint, as well as the filter coefficients, are optimized at each step subject to the constraint on the total number of coefficients. In this way, both the optics and the image processing filter coefficients and footprint are optimized in a joint fashion.

The design approach described above is now applied to a specific example, comparing the results to those achieved by a conventional design approach. The electro-optical imaging system has the following general specifications:

Detector has 4000×3 pixels (RGB)
T=15 μm pixels having 75% fill factor
Quantum well size of 10,000 photons
Focal length of 72.5 mm
Entrance pupil diameter of 12 mm
Three lens system using BK7 glass for the outer elements and F2 glass for the center element
Wavelengths of light of 656 nm (R), 588 nm (G) and 486 nm (B)
Object distance of 500 mm
Digital filters are limited to N×N footprint. The design comparison is made for different values of N.

The twelve optical design parameters included the six surface curvatures, the three lens thicknesses, two air spacings, and the back focal distance. Such a design is difficult due to the wide field of view and the short object distance.

The entire end-to-end systems are designed using three different approaches:

A. Conventional: First, the optical subsystem is designed by optimizing the wavefront error (OPD-RMS). Then, given the so designed optical subsystem, the digital filter is designed using Eqns. 15 and 16.

B. Hybrid Wiener: First, the optical subsystem and digital image processing subsystem are jointly designed, but assuming Wiener filtering for the digital image processing subsystem. Then, given the so-designed optical subsystem, the actual size-constrained digital filter is designed using Eqns. 15 and 16.

C. Size-constrained: The optical subsystem and digital image processing subsystem are jointly designed, including the size constraint on the digital filter.

Figure 11:
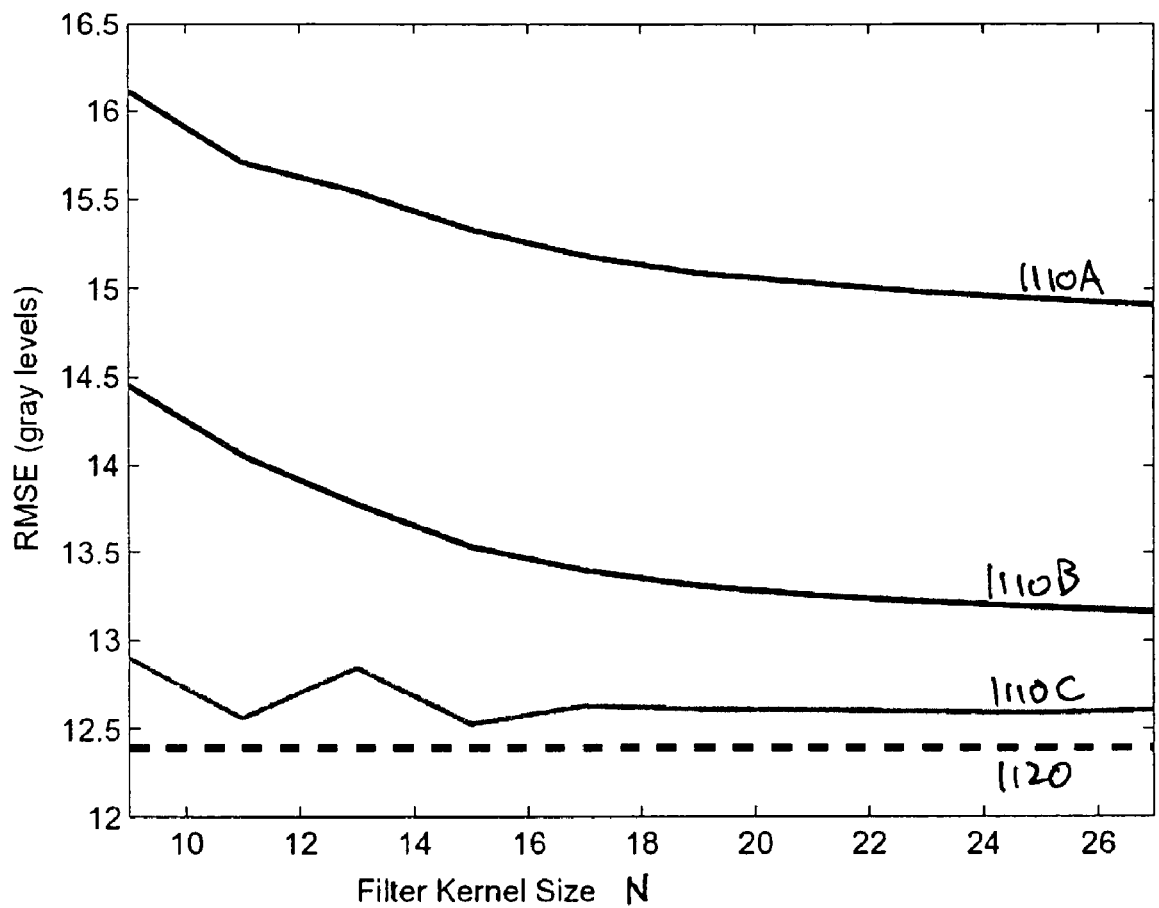
FIG. 11 is a graph of RMSE as a function of filter size N, comparing three different design approaches.

FIG. 11 graphs the intermediate RMSE (Eqn. 11) as a function of N, for the three design approaches. Curve 1110A is for the conventional approach. Curve 1110B is for the hybrid Wiener approach. Note that even though the system was optimistically designed for FFT-based image processing, when using size-constrained filters the overall performance is still about 10 percent better than the traditional design 1110A. Curve 1110C is for the size-constrained approach. As a reference, curve 1120 shows the performance of this system when Wiener filtering is used, and the optical subsystem and Wiener filter are jointly designed.

Although the detailed description contains many specifics, these should not be construed as limiting the scope of the invention but merely as illustrating different examples and aspects of the invention. It should be appreciated that the scope of the invention includes other embodiments not discussed in as much detail above.

As another example, in the description above, the source object geometry was a simple plane at a known distance. One variation is to apply a probability distribution on the distance $z_o$ of the object to account for possible mechanical tolerances or defocus. As another example, for purposes of clarity, the cases described above were primarily monochromatic. Polychromatic cases can also be accommodated. The models used could include wavelength information and/or color sampling equations. Also, while the example optical subsystems are all lens-based, this is not a requirement. Mirrors, diffractive and other optical elements can also be used.

Various other modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method for designing an electro-optic imaging system for imaging a source, the electro-optic imaging system including an optical subsystem, a detector subsystem and a digital image processing subsystem that includes at least one digital filter, the digital filter including one or more filter kernels, the method comprising:

modeling propagation of the source through the optical subsystem, the detector subsystem and the digital image processing subsystem based on a spatial model of the source;

calculating a post-processing performance metric that is a function of the modeled propagation; and jointly designing the optical subsystem and the digital filter based directly on the post-processing performance metric and subject to size and/or footprint constraints on the digital filter, wherein the step of jointly designing the optical subsystem and the digital filter comprises adjusting coefficients of the filter kernels and adjusting footprints of the filter kernels.

2. The method of claim 1 wherein the step of jointly designing the optical subsystem and the digital filter is performed without requiring a direct optimization of an image quality of an intermediate optical image of the source formed by the optical subsystem.

3. The method of claim 1 wherein the digital filter is spatially varying over image space.

4. The method of claim 3 wherein the image space is divided into filter domains and the digital filter is spatially invariant within each filter domain but may vary from domain to domain.

5. The method of claim 1 wherein the digital filter is spatially invariant over image space.

6. The method of claim 1 wherein the digital filter is separable into two one-dimensional digital filters.

7. The method of claim 1 wherein a footprint of the digital filter is disjoint.

8. The method of claim 1 wherein the digital filter is a wavelength-independent digital filter that is applied to different color channels from the detector subsystem.

9. The method of claim 1 wherein the digital image processing subsystem includes wavelength-dependent digital filters, each of which is applied to a different color channel from the detector subsystem.

10. The method of claim 1 wherein propagation through the optical subsystem is based on a point spread function for the optical subsystem that is modeled as spatially varying over the image space.

11. The method of claim 10 wherein the image space is divided into tiles and the point spread function is modeled as spatially invariant within each tile but may vary from tile to tile.

12. The method of claim 1 wherein the coefficients are adjusted separately from the footprints.

13. The method of claim 1 wherein the image space is divided into filter domains, the digital filter include a filter kernel for each filter domain, and the step of jointly designing the optical subsystem and the digital filter comprises adjusting coefficients of the filter kernels and adjusting an extent of the filter domains.

14. The method of claim 13 wherein the step of jointly designing the optical subsystem and the digital filter further comprises adjusting footprints of the filter kernels.

15. The method of claim 1 wherein the step of jointly designing the optical subsystem and the digital filter comprises:

precorrecting an intermediate image for geometric distortion; and adjusting the digital filter based on the precorrected intermediate image.

16. The method of claim 15 wherein:

the step of precorrecting the intermediate image for geometric distortion comprises removing a spatial shift from the point spread function; and the step of adjusting the digital filter comprises adjusting the digital filter based on the point spread function after removal of the spatial shift.

17. The method of claim 1 wherein the step of jointly designing the optical subsystem and the digital filter comprises adjusting the digital filter without regard for geometric distortion.

18. The method of claim 1 wherein the spatial model of the source includes a two-dimensional power spectral density function.

19. The method of claim 1 wherein the spatial model of the source includes a statistical model of the source.

20. The method of claim 1 wherein propagation through the optical subsystem and detector subsystem is modeled by y=Hs+n, where y is an image of the source after propagation through the optical subsystem and the detector subsystem, s is an ideal sampled image of the source, H is a sampled point spread function accounting for both the optical subsystem and the detector subsystem, and n is noise.

21. The method of claim 1 wherein the post-processing performance metric is a mean square error between an ideal image of the source and an image predicted by the modeled propagation of the source through the optical subsystem, the detector subsystem and the digital image processing subsystem.

22. A software product comprising instructions stored on a computer readable medium, wherein the instructions cause a processor to assist in a design of an electro-optic imaging system by executing the following steps:

(a) accessing a spatial model of a source;

(b) based in part on the spatial model, modeling propagation of the source through an electro-optic imaging system; the electro-optic imaging system comprising an optical subsystem, a detector subsystem and a digital image processing subsystem that includes at least one digital filter, the digital filter including one or more filter kernels;

(c) calculating a post-processing performance metric that is a function of the modeled propagation;

(d) adjusting the optical subsystem and the digital filter based directly on the post-processing performance metric and subject to size and/or footprint constraints on the digital filter, wherein the step of jointly designing the optical subsystem and the digital filter comprises adjusting coefficients of the filter kernels and adjusting footprints of the filter kernels; and (e) repeating steps (b) and (c) and (d) to improve the post-processing performance metric.

23. A system for designing an electro-optic imaging system for imaging a source, the electro-optic imaging system including an optical subsystem, a detector subsystem and a digital image processing subsystem that includes at least one digital filter, the digital filter including one or more filter kernels, the system comprising:

means for modeling propagation of the source through the optical subsystem, the detector subsystem and the digital image processing subsystem based on a spatial model of the source;

means for calculating a post-processing performance metric that is a function of the modeled propagation; and means for jointly designing the optical subsystem and the digital filter based directly on the post-processing performance metric and subject to size and/or footprint constraints on the digital filter, wherein the step of jointly designing the optical subsystem and the digital filter comprises adjusting coefficients of the filter kernels and adjusting footprints of the filter kernels.

* * * * *